US010894608B2

(12) United States Patent
Klemen et al.

(10) Patent No.: US 10,894,608 B2
(45) Date of Patent: Jan. 19, 2021

(54) FUEL THERMAL CAPACITANCE FOR PULSED PLATFORM LOADS

(71) Applicant: Rolls-Royce Corporation, Indianapolis, IN (US)

(72) Inventors: Donald Klemen, Carmel, IN (US); Eric Wilson, Mooresville, IN (US); Russell E. White, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 45 days.

(21) Appl. No.: 16/411,946

(22) Filed: May 14, 2019

(65) Prior Publication Data

US 2020/0361624 A1 Nov. 19, 2020

(51) Int. Cl.
*B64D 37/34* (2006.01)
*F41H 13/00* (2006.01)
*B64D 41/00* (2006.01)
*F28D 21/00* (2006.01)

(52) U.S. Cl.
CPC ............ *B64D 37/34* (2013.01); *B64D 41/00* (2013.01); *F41H 13/0043* (2013.01); *F28D 2021/0021* (2013.01)

(58) Field of Classification Search
CPC ..... B64D 37/34; B64D 41/00; F41H 13/0043; F28D 2021/0021
See application file for complete search history.

(56) References Cited

U.S. PATENT DOCUMENTS

| 4,273,304 | A | 6/1981 | Frosch et al. |
| 4,505,124 | A | 3/1985 | Mayer |
| 9,561,857 | B2 | 2/2017 | Weber |
| 10,053,222 | B2 | 8/2018 | Snyder |
| 2015/0217153 | A1* | 8/2015 | Jones ..................... B64D 45/00 169/62 |

OTHER PUBLICATIONS

Sean Robert Nuzum, Aircraft Thermal Management using Liquefied Natural Gas, 2016, Wright State University, Theses and Dissertations. 1480. (Year: 2016).*
Donovan, Adam B., "Vehicle Level Transient Aircraft Thermal Management Modeling and Simulation," Thesis, BS Mechanical Engineering, Wright State University, 2016, 82pgs.
Faith, L.E., et al., "Heat Sink Capability of a Jet a Fuel: Heat Transfer and Coking Studies," Shell Development Company, N71-31482, Jul. 1971, 132pgs.

* cited by examiner

*Primary Examiner* — Emmanuel E Duke
(74) *Attorney, Agent, or Firm* — Brinks Gilson & Lione

(57) ABSTRACT

A thermal management system for a pulse load on an aircraft. The thermal management system utilizing the reserve fuel from the aircraft to create thermal capacitance such that the instantaneous capacity of the cooling system to remove heat from the aircraft may be sized less than the rate of heat generated by the pulsed load (e.g. laser, radar, rail gun etc.) The reserve fuel is maintained at a temperature in a reservoir and cooled via a cooling system. Fuel from the reservoir is selectively mixed with fuel exiting the pulsed load heat exchanger to provide fuel to the inlet of the heat exchanger at a predetermined temperature, the temperature based at least upon the heat generated by the laser, flow rate of fuel and efficiency of the heat exchanger.

22 Claims, 5 Drawing Sheets

FUEL THERMAL CAPACITANCE FOR PULSED PLATFORM LOADS

BACKGROUND

In certain high-energy applications, the demand on the equipment may be transient, e.g. experience periods of relatively low loading, followed by brief periods of extremely high loading and heat generation. One example of a high energy systems with a transient/or pulsed load is a directed energy weapon, which typically exhibits low energy requirements when not preparing to fire but has brief periods (impulses) of extremely high energy demand when preparing to fire. Thus equipment associated with these systems which provide power to high energy systems such as a directed energy weapon must necessarily be designed to not only handle the wide range of energy demand and rapid transients presented by such operations, but also the unique thermal management associated therewith.

In certain systems where size and weight are considerable influences on operations, such as a mobile land system or aircraft based system, the ability to efficiently and effectively manage the thermal output is a non-trivial task. While a fixed terrestrial weapon may simply provide a cooling system with a rated continuous capacity equal to the peak demand, for the mobile systems, it may be desirable to minimize the size/weight of the thermal management system, without also resorting to carrying excess capacity and its associated drawbacks, weight, cost, mobility etc. Thus a thermal management system of minimum size and weight capable of absorbing peak loads with minimum energy draw would be beneficial.

The disclosed system meets the transient demands using a thermal capacitance reservoir utilizing fuel and the attendant fuel storage systems already incumbent to the mobile platform, e.g. fuel for the directed energy system, fuel for the platform vehicle, etc. In using the already existent fuel, the system minimizes the additional size and weight of the thermal management system and allows the thermal management system to operate at a steady state point well below the peak load requirements. The system utilizes the thermal capacitance (heat storage capacity) to absorb the transient heat output from the high energy systems and dissipates the extracted heat over time, and maintains the high energy system at a constant temperature.

SUMMARY

Disclosed is a system include a prime driver with an energy conversion engine and a fuel tank, a reservoir, a cooling system, and an intermittent heat generating device. The intermittent heat generating device may have a peak heat output greater than a peak cooling capacity of the cooling system. Also included may be a first fuel loop, a second fuel loop and a fuel charging line. The first fuel loop may include a recirculating path through a first heat exchanger in thermal communication with the cooling system, a first pump and the reservoir. The second fuel loop may include a second recirculating path through a second pump, a second heat exchanger in thermal communication with the intermittent heat generating device and a variable mixing valve. The variable mixing valve may have a first input, a second input and an output to the second fuel loop. The first input may be from the first fuel loop and the second input may be from the second fuel loop. A ratio of the second input over the first input may be variable. The fuel charging line may include a fuel path between the reservoir and the fuel tank and a reservoir charge pump in the fuel path. The first fuel loop may be in fluid communication with the second fuel loop via the mixing value and a return line. The return line may communicate from a fuel outlet of the intermittent heat generating device to a check valve on the first fuel loop.

Some embodiments may further include a vent from the reservoir to the fuel tank. In some embodiments, the second heat exchanger has a fuel inlet temperature and a fuel outlet temperature. In some embodiments, the fuel inlet temperature is predetermined as a function of fuel flow rate through the heat exchanger. In some embodiments, the predetermined inlet fuel temperature is constant for a given fuel flow rate. In some embodiments, the ratio is a function of the predetermined inlet fuel temperature. In some embodiments, the ratio is a function of a first fuel input temperature. Some embodiments may further include, a one-way valve at an interface connecting the return line to the first loop, the one-way valve allowing fuel from the return line into the first loop and preventing fuel from the first loop from entering the return line. In some embodiments, the cooling system via the first heat exchanger removes heat from the first loop. In some embodiments, the cooling system is activated as a function of a temperature of fuel in the reservoir. In some embodiments, a fuel capacity of the reservoir is greater than the fuel capacity of the first loop and a fuel capacity of the fuel tank is greater than the fuel capacity of the reservoir, first loop and second loop combined. In some embodiments, the fuel capacity of the reservoir, first loop and second loop are 10 percent or less than the capacity of the fuel tank. In some embodiments, the intermittent heat generator is a directed energy weapon or electromagnetic rail gun. In some embodiments, the ratio R is determined according to the following function:

$$R = \frac{(T_{inlet} - T_r)}{(T_o - T_{inlet})}$$

where $T_{inlet}$ is a predetermined fuel inlet temperature of the second heat exchanger, $T_R$ is temperature of the fuel in the reservoir and $T_O$ is the fuel outlet temperature of the heat exchanger, and R is the recirculation flow of $T_O$ to reservoir flow of $T_R$ or Qo/Qr.

Also disclosed is a method of cooling an intermittent heat generating device on a mobile platform. The method may include charging a reservoir and fuel circulation lines with fuel from a fuel tank on the mobile platform; maintaining the reservoir at a first temperature; circulating fuel through the fuel circulation lines and the reservoir; predetermining a fixed temperature for fuel entering a heat exchanger as a function of fuel flow rate through the heat exchanger. The heat exchanger may be in thermal communication with the intermittent heat generating device. The method may also include mixing, via a variable mixing valve, fuel from the reservoir at the first temperature and fuel exiting the heat exchanger together to output fuel at the predetermined fixed temperature. The ratio of the amount of fuel exiting the heat exchanger that is mixed over the amount of fuel from the reservoir that is mixed may be a function of the first temperature, the predetermined fixed temperature and a temperature of the fuel exiting the heat exchanger. The method may also include supplying the fuel output from the mixing step to the heat exchanger; and, transferring heat from the heat exchanger to the fuel in the heat exchanger.

In some embodiments, the step of mixing fuel comprising recirculating at least a portion of the fuel exiting the heat exchanger to the variable valve and a remainder of the fuel exiting the heat exchanger to the reservoir. Some embodiments may also include cooling the remainder of the fuel prior to recirculating to the reservoir. The cooling may be at a rate less than the instantaneous rate of heat generation by the intermittent heat generating device. In some embodiments, the ratio R may be determined with the function:

$$R = \frac{(T_{inlet} - T_r)}{(T_o - T_{inlet})}$$

where $T_{inlet}$ is a predetermined fuel inlet temperature of the second heat exchanger, $T_R$ is temperature of the fuel in the reservoir and $T_O$ is the fuel outlet temperature of the heat exchanger.

In some embodiments, the mobile platform is an aircraft and at least a portion of the fuel in the reservoir represents the aircraft's reserve. The aircraft's reserve may be pumped from the reservoir to the gas tank when the aircraft's reserve fuel is required to power the aircraft. Some embodiments may further include supplying a portion of the fuel exiting the heat exchanger to an engine powering the intermittent heat generating device or powering the mobile platform. Some embodiments may further include circulating fuel from the fuel tank through the reservoir if the temperature of fuel in the fuel tank is less than the temperature of the reservoir. Some embodiments may further include. Some embodiment may further include circulating fuel from the reservoir to the fuel tank is the fuel in the fuel tank has a higher temperature.

BRIEF DESCRIPTION OF THE DRAWINGS

The following will be apparent from elements of the figures, which are provided for illustrative purposes.

Figure 1:
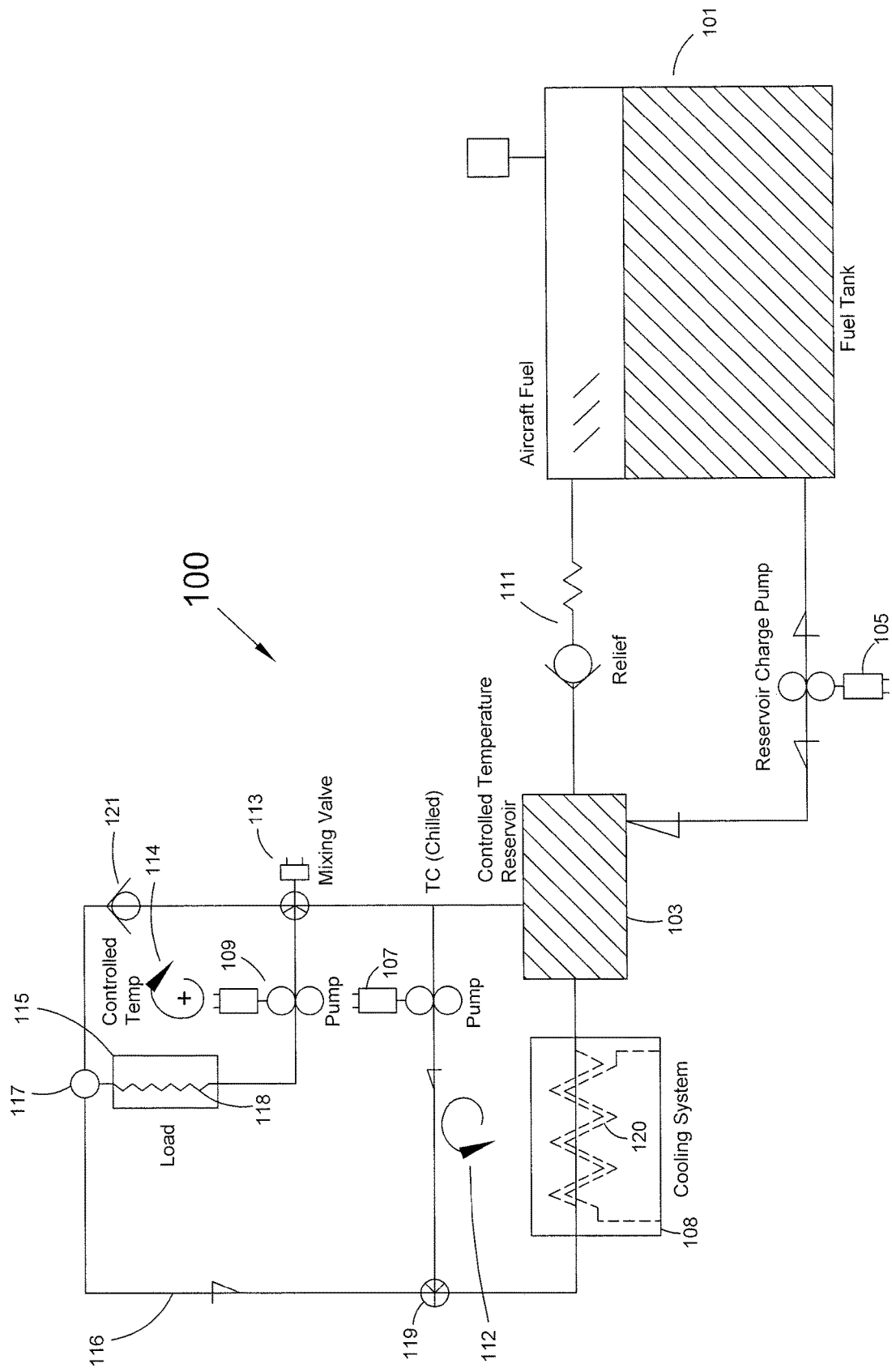
FIG. 1 illustrates a thermal management system according to an embodiment of the disclosed subject matter.

The present application discloses illustrative (i.e., example) embodiments. The claimed inventions are not limited to the illustrative embodiments. Therefore, many implementations of the claims will be different than the illustrative embodiments. Various modifications may be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The disclosed thermal management system supplies a constant temperature flow of fuel to act as a heat sink for a system that produces a transient or pulsed thermal heat load. As shown in FIG. 1, fuel from the aircraft fuel tank 101 is supplied to the thermal management system 100 by the charge pump 105. Charge pump 105 can also be used to drain the thermal management system 100 if the aircraft fuel tank begins to run low on fuel, alternatively the aircraft may draw from other areas of the thermal management system 100 such as from the return line 116. Relief valve 111 may remove vapor from the system as the controlled temperature reservoir 103 is filled. Additionally, if the fuel in the fuel tank 101 is cooler than the reservoir temperature, the charge pump 105 may circulate fuel from the fuel tank 101 to the reservoir 103 and back into the fuel tank 101 until the respective temperatures are equalized. Conversely if increasing temperature in the fuel tank 101 becomes a concern, the charge pump 105 may also perform the same circulation to cool the fuel tank 101, this action may also be performed in anticipation of heavy use of the pulsed load device 115 to increase the available thermal capacitance. The heat management system 100 uses two parallel flow paths; one path (a reservoir loop) 112 driven by pump 107 and the other (a load loop) 114 driven by pump 109. Pump 107 is balanced with pump 109 to ensure a desired amount of fluid flow in the load loop 114 is directed to the pulsed load 115. The pulsed load 115 may be a type of intermittently used electrical, chemical or mechanical equipment like a high powered radar, directed energy weapon, rail gun etc. Valve 117 will split the flow exiting the heat exchanger 118 of the pulsed load device 115. A portion will flow recirculates to load mixing valve 113 via the load loop 114, where it is mixed with fuel exiting the controlled temperature reservoir 103. The mixing valve 113 may be a variable thermostatic mixing valve or computer controlled variable mixing valve, etc. Load mixing valve 113 may throttle the fuel flow between the fuel sources (reservoir loop 112, heat exchanger 118) to produce the correct or desired fuel temperature entering the load loop 114.

The mixing of the fuel from the reservoir 103 and the pulsed load's heat exchanger outlet is a function of the fuel inlet temperature to the pulse load heat exchanger 118. The selection of the fuel inlet temperature may be a function of the rate of heat generation of the pulse load 115, the rate the flow rate of the fuel through the heat exchanger 118, the efficiency of the heat exchanger 118 and/or the heat tolerance of the pulsed load device 115. The fuel inlet temperature may be predetermined for an associated fuel flow rate, for example a higher fuel mass flow rate may allow for a higher fuel inlet temperature and conversely a lower fuel mass flow rate may require a comparative lower fuel inlet temperature. For a set mass flow rate of fuel, the ratio between the amounts of heat exchanger outlet fuel over reservoir fuel may be governed by the function:

$$R = \frac{(T_{inlet} - T_r)}{(T_o - T_{inlet})}$$

where $T_{inlet}$ is fuel inlet temperature of the second heat exchanger, $T_R$ is temperature of the fuel in the reservoir and $T_O$ is the fuel outlet temperature of the second heat exchanger.

Table 1 illustrates several examples of Tinier, $T_R$ and $T_O$, for a given flow rate and the associated ratios R for an embodiment of the disclosed subject matter.

TABLE 1

| Parameter | Example 1 | Example 2 | Example 3 | Example 4 | Example 5 |
| --- | --- | --- | --- | --- | --- |
| $T_O$ (degrees) | 82 | 82 | 82 | 82 | 82 |
| $T_R$ (degrees) | 30 | 50 | 60 | 70 | 80 |
| $T_{inlet}$ (degrees) | 80 | 80 | 80 | 80 | 80 |
| Reservoir fuel in inlet flow | 4% | 6% | 9% | 17% | 100% |
| Heat exchanger outlet fuel in inlet flow | 96% | 94% | 91% | 83% | 0% |
| $R = Qo/Qr$ | 25 | 15 | 10 | 5 | 0 |

As shown above, the lower the temperature of the reservoir fuel, the less reservoir fuel is mixed to achieve the desired fuel temperature at the inlet of the heat exchanger 118. The mixing valve 11 may continually adjust the ratio R depending on the inputs. It is desirable that the reservoir temperature be less than or equal to the $T_{inlet}$, however, when both the heat exchanger outlet fuel and reservoir fuel temperatures exceed $T_{inlet}$, the mixing valve may signal a fault to disable the pulse load 115, may provide a warning, and/or may simply provide one or the other of the output or reservoir fuels depending on which ever has a lower temperature to delay failure. The throughput of the pump may also be varied to achieve the desired cooling, for example when the differential between $T_o$ and $T_{inlet}$ increases, it is desirable in increase the flow through the heat exchanger. In other words Pump flow is a function of dT ($T_0$-$T_{inlet}$), heat output of the pulse load and the specific heat of fluid, whereas the distribution (ratio) of flow from the outlet vs flow from the reservoir is a function of the respective temperatures. The inlet flow may be scheduled as a function or dT and/or the other parameters.

Valve 117 may direct the remaining portion of load loop flow to the bypass loop 116 (i.e. return line) through bypass mixing valve 119. The fuel flow is then directed to a heat exchanger 120 though line 205. The heat exchanger 120 interacts with a cooling system 108, the cooling system 108 being that of the platform's or a separate dedicated cooling system 108 for the pulse load 115. While the platform used to illustrate the disclosed subject matter is an aircraft, the platform is not so limited. It is also envisioned trucks, transports, drones, spacecraft and other mobile vehicles may advantageously implement the disclosed system for onboard pulsed loads. The cooling system 108 is preferably sized to have a peak capacity less than the peak heat generation capacity of the pulsed load 115. This sizing minimizes the size and weight of the cooling system by utilizing the thermal capacitance of the reservoir 103 and discharging the heat energy over a longer duration.

Heat from the pulsed load 115 is transferred to the cooling system 108 when the load is active and the bypass loop temperature is greater than the cooling system temperature (i.e. reservoir temperature), or the cooling system 108 may be inactive if the load is inactive and the bypass loop temperature is less than the cooling system temperature. Irrespective of the state of the impulse load 115, the cooling system 108 advantageously cools the fuel in the reservoir cooling loop 112 to maintain the desired reservoir temperature.

Figure 2:
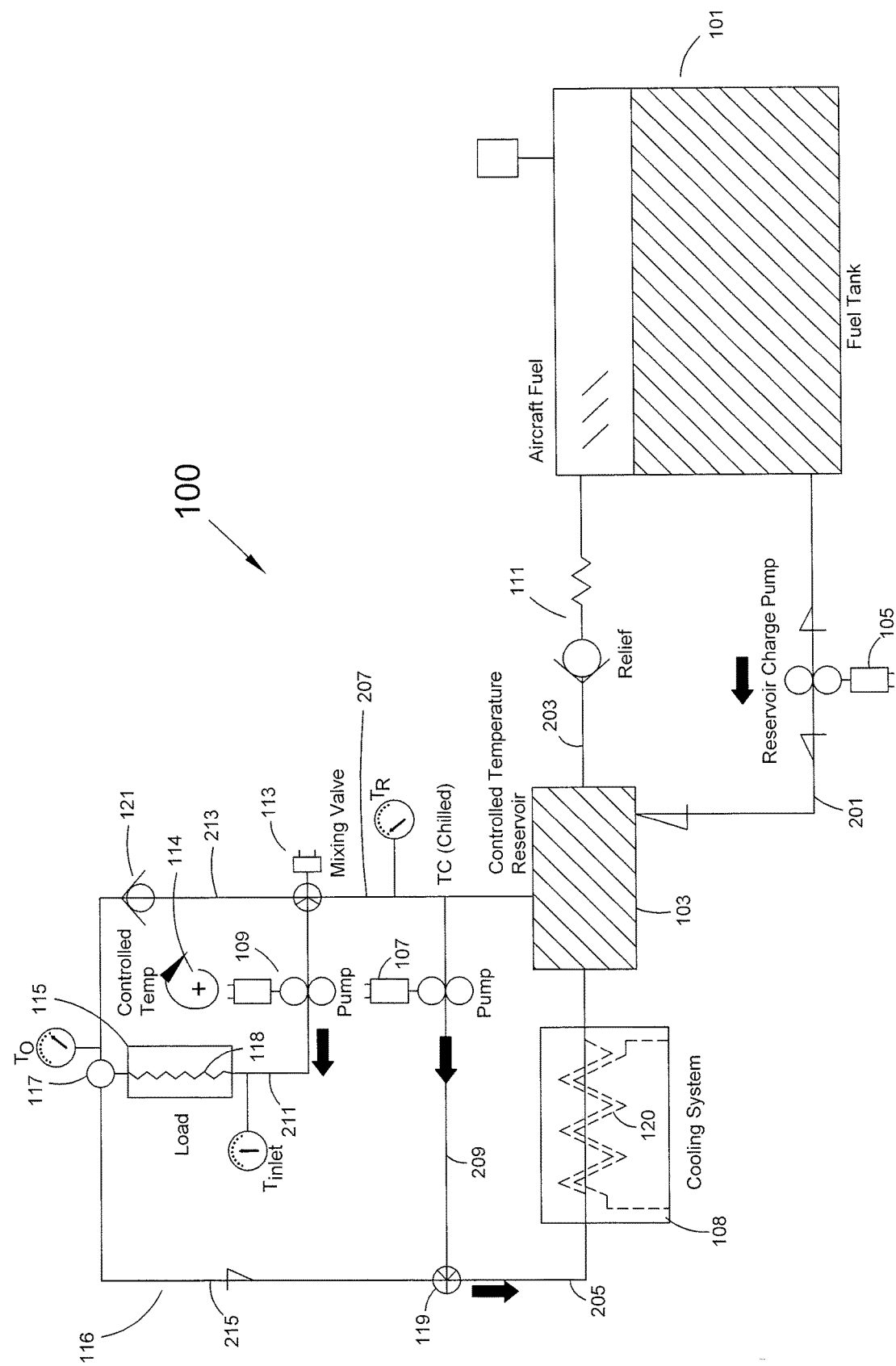
FIG. 2 illustrates the fluid flow paths when charging the system.

During system start-up and system priming, as shown in FIG. 2, the charge pump 105 directs fuel from the fuel tank 101, through the charging line 201 into the control temp reservoir 103. The fuel will be directed through line 207 of the reservoir cooling loop 112 to load mixing valve 113 or to mixing valve 119 through pump 107 along line 209. Load mixing valve 113 will direct flow into the load loop 114. The fuel flow will travel through pump 109, load input line 211, through the pulsed load 115 to valve 117, which may split the flow through load return line 213 to load mixing valve 113 or through the load exhaust line 215 to the bypass mixing valve 119. Mixing valves 117 and 119 may be passive valves (i.e. not controlling the output mixture) allowing the flows to mix and preventing flows from reversing similar to the check valves described. Check valve 121 may ensure flow does not reverse within load return line 213, other check valves may similarly be placed within the system as desired. Bypass (return) mixing valve 119 directs from the return 116 and the reservoir loop 112 on line 209 to the reservoir return line through heat exchanger 120. Air may collect in the controlled temperature reservoir 103 and relief valve 111 may be opened to allow air to exit the control temperature reservoir 103 though relief line 203 and collect in the aircraft's fuel tank 101.

Figure 3:
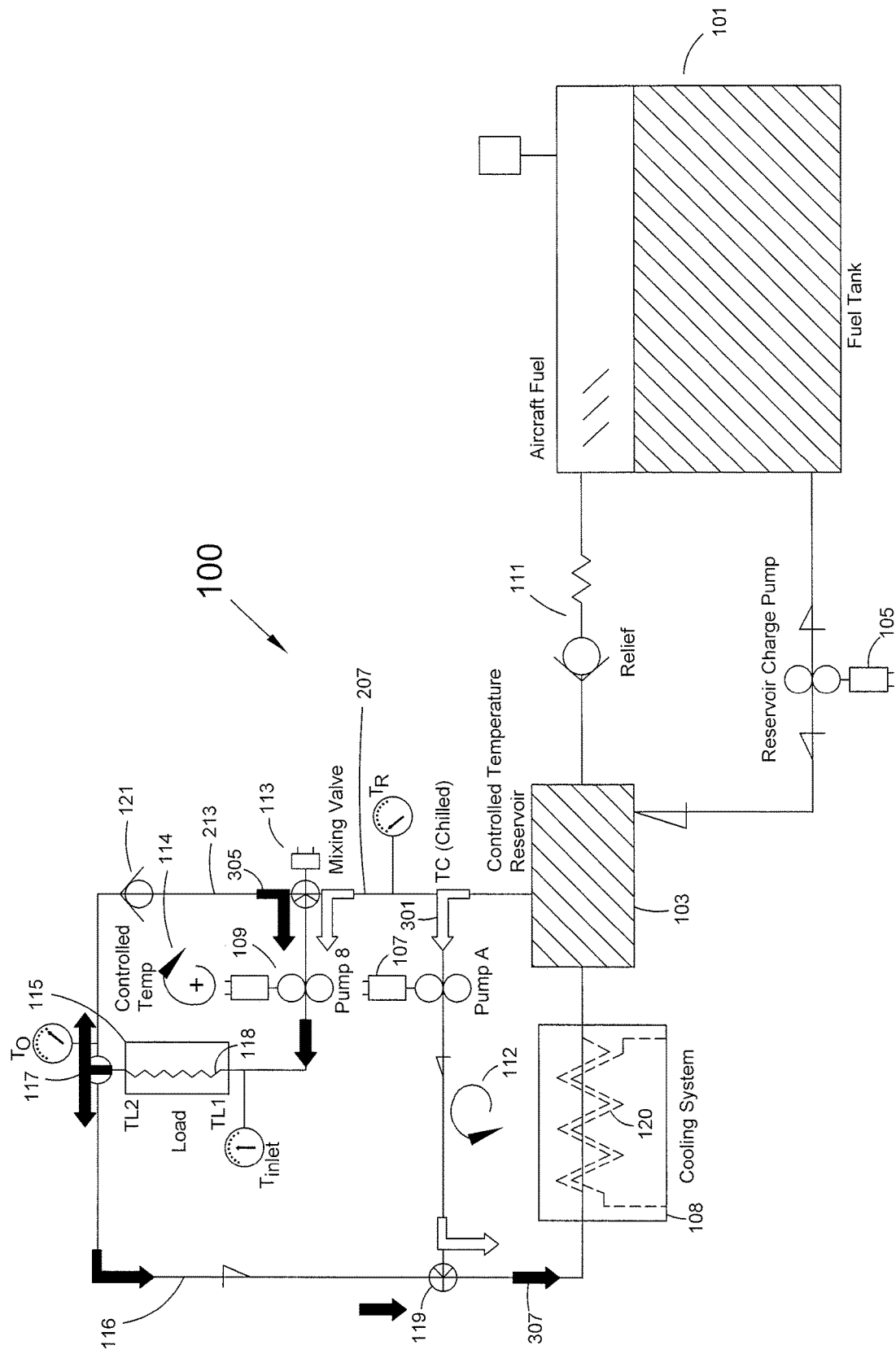
FIG. 3 illustrates the thermal management system during operation of the pulsed load.

FIG. 3 depict sample temperature distributions and mixing ratios based on the controlled temperature reservoir ($T_R$) 301. As the pulse load outlet temperature ($T_O$) increases the load mixing valve may decrease the ratio between the amount of outlet to reservoir fuel. Similarly, as $T_R$ 301 increases compared to the pulsed load outlet temperature $T_O$ 305 the load mixing valve 113 may allow more flow from the outlet line 207 while reducing flow from load return line 213. The mix may be continuously varied to maintain the load inlet fluid temperature ($T_{inlet}$) constant. Bypass return line fluid temperature 307 may be allowed to fluctuate based on the interaction of the fluid flow in the bypass mixing valve 119. Flow in the cooling system 115 may be controlled to heat or cool the bypass return line to maintain the controlled temperature reservoir 103 in an acceptable range. Charging pump 105 and relief valve 111 may also replace fuel within the controlled temperature reservoir to maintain temperature if necessary. In some embodiments pump 107 and pump 109 can be combined into a single pump.

Figure 4:
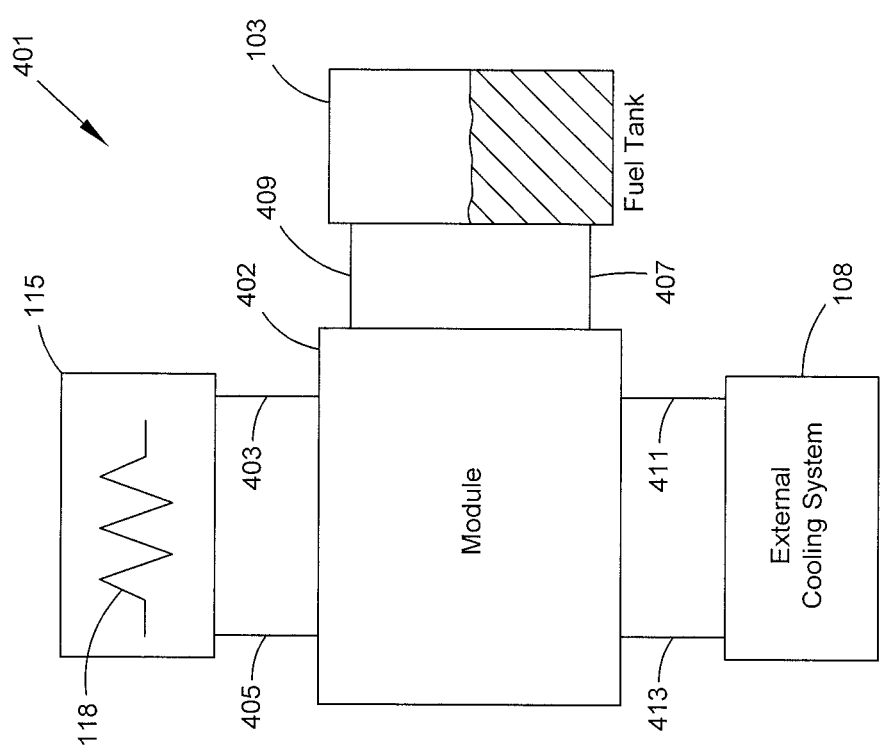
FIG. 4 illustrates the thermal management system integrated into a module.

FIG. 4 illustrates an embodiment 401 in which the pumps, mixing valves, reservoir and piping may also be integrated into a single component or module 402. In FIG. 4 the module 402 is connected to the pulsed load 115 via supply 403 and return 405 lines, to the fuel tank 101 via a charge 407 and vent 409 lines, and to the cooling system 108 via input 411 and output 413 lines. The function of the pumps, mixing valves and check valves as described with respect to FIGS. 1-3 are accomplished within the module 402. By using a module, the system may be integrated into existing or future platforms.

Figure 5:
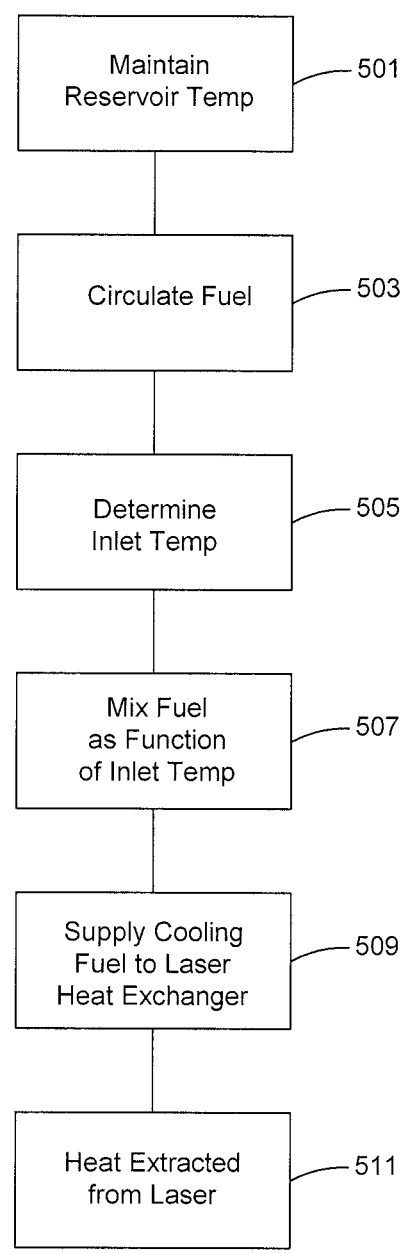
FIG. 5 illustrate a method of cooling an intermittent heat generating device according to embodiments of the disclosed subject matter.

FIG. 5 illustrate a method of cooling an pulsed load, such as a laser, within and aircraft. As shown in Block 501, the reservoir is maintained at a first temperature via an external cooling system. The reservoir preferably contains the aircraft's fuel reserve being available to be pumped from the reservoir to the gas tank if required. As noted previously, preferably the size of the external cooling system is minimized and has a capacity rate much less than the instantaneous rate that heat is generated by the laser.

Fuel is circulated through the fuel lines and the reservoir as shown in Block 503 as part of the mechanism of cooling the pulsed load and maintaining the reservoir temperature. The temperature of the fuel entering the heat exchanger associated with the pulsed load is determined, considering the fuel flow rate, heat exchanger efficiency and rate of heat generation by the laser pulsed load as shown in Block 505.

Fuel from the reservoir and fuel exiting the heat exchanger are mixed together with a variable mixing valve as shown in Block 507, The ratio of the mixture is determined such that the fuel output from the variable mixing valve is at the predetermined fixed temperature. At least a portion of the fuel exiting the heat exchanger is recirculated to the variable valve and a remainder of the fuel exiting the heat exchanger is recirculated to the reservoir. The remainder of the fuel may be cooled prior to recirculating to the reservoir or may be supplied directly to the aircraft's engine to burn.

The fuel output from the variable mixing valve 113 is supplied to the heat exchanger 118 as shown in Block 509; and, transferring heat generated by the pulsed load is transferred to the fuel via the heat exchanger 118 as shown in Block 511.

Although examples are illustrated and described herein, embodiments are nevertheless not limited to the details shown, since various modifications and structural changes may be made therein by those of ordinary skill within the scope and range of equivalents of the claims.

What is claimed is:

1. A system, comprising:
   a fuel tank;
   a reservoir;
   a cooling system;
   an intermittent heat generating device; the intermittent heat generating device having a peak heat output greater than a peak cooling capacity of the cooling system;
   a first fuel loop, a second fuel loop and a fuel charging line;
   the first fuel loop comprising a recirculating path through a first heat exchanger in thermal communication with the cooling system, a first pump and the reservoir;
   the second fuel loop comprising a second recirculating path through a second pump, a second heat exchanger in thermal communication with the intermittent heat generating device and a variable mixing valve;
   the variable mixing valve having a first input, a second input and an output, the output to the second fuel loop, the first input from the first fuel loop and the second input from the second fuel loop; a ratio of the second input over the first input being variable;
   the fuel charging line comprising a fuel path between the reservoir and the fuel tank and a reservoir charge pump in the fuel path; and,
   the first fuel loop in fuel connection with the second fuel loop via the mixing value and a return line; the return line communicating from a fuel outlet of the intermittent heat generating device to a check valve on the first fuel loop.

2. The system of claim 1 further comprising a vent from the reservoir to the fuel tank.

3. The system of claim 1, wherein the second heat exchanger has a fuel inlet temperature and a fuel outlet temperature.

4. The system of claim 3, wherein the ratio is a function of a first fuel input temperature.

5. The system of claim 1, wherein the fuel inlet temperature is predetermined as at least a function of fuel flow rate through the heat exchanger.

6. The system of claim 5, wherein the predetermined inlet fuel temperature is constant for a given fuel flow rate.

7. The system of claim 5, wherein the ratio is a function of the predetermined inlet fuel temperature.

8. The system of claim 1, further comprising a one-way valve at an interface connecting the return line to the first loop, the one-way valve allowing fuel from the return line into the first loop and preventing fuel from the first loop from entering the return line.

9. The system of claim 1, wherein the cooling system via the first heat exchanger removes heat from the first loop.

10. The system of claim 9, wherein the cooling system is activated as at least a function of a temperature of fuel in the reservoir.

11. The system of claim 1, wherein a fuel capacity of the reservoir is greater than the fuel capacity of the first loop and a fuel capacity of the fuel tank is greater than the fuel capacity of the reservoir, first loop and second loop combined.

12. The system of claim 11, wherein the fuel capacity of the reservoir, first loop and second loop are 10 percent or less than the capacity of the fuel tank.

13. The system of claim 1, wherein the intermittent heat generator is a directed energy weapon, radar system or electromagnetic rail gun.

14. The system of claim 1, where the ratio R is determined according to the following function:

$$R = \frac{(T_{inlet} - T_R)}{(T_O - T_{inlet})}$$

where $T_{inlet}$ is a predetermined fuel inlet temperature of the second heat exchanger, $T_R$ is temperature of the fuel in the reservoir and $T_O$ is the fuel outlet temperature of the second heat exchanger.

15. A method of cooling an intermittent heat generating device, the method comprising:
   charging a reservoir and fuel circulation lines with fuel from a fuel tank on the mobile platform;
   maintaining the reservoir at a first temperature;
   circulating fuel through the fuel circulation lines and the reservoir;
   predetermining a fixed temperature for fuel entering a heat exchanger as a function of fuel flow rate through the heat exchanger, the heat exchanger in thermal communication with the intermittent heat generating device;
   mixing, via a variable mixing valve, fuel from the reservoir at the first temperature and fuel exiting the heat exchanger together to output fuel at the predetermined fixed temperature, wherein the ratio of the amount of fuel exiting the heat exchanger that is mixed over the amount of fuel from the reservoir that is mixed is a function of the first temperature, the predetermined fixed temperature and a temperature of the fuel exiting the heat exchanger;
   supplying the fuel output from the mixing step to the heat exchanger; and,
   transferring heat from the heat exchanger to the fuel in the heat exchanger.

16. The method of claim 15, wherein the step of mixing fuel comprising recirculating at least a portion of the fuel exiting the heat exchanger to the variable valve and a remainder of the fuel exiting the heat exchanger to the reservoir.

17. The method of claim 16, comprising cooling the remainder of the fuel prior to recirculating to the reservoir; wherein the step of cooling is at a rate less than the instantaneous rate of heat generation by the intermittent heat generating device.

18. The method of claim 15, determining the ratio R with the function:

$$R = \frac{(T_{inlet} - T_R)}{(T_o - T_{inlet})}$$

where $T_{inlet}$ is a predetermined fuel inlet temperature of the second heat exchanger, $T_R$ is temperature of the fuel in the reservoir and $T_O$ is the fuel outlet temperature of the second heat exchanger.

19. The method of claim 15, wherein at least a portion of the fuel in the reservoir represents a fuel reserve, the fuel reserve being pumped from the reservoir to the gas tank when the reserve fuel is required.

20. The method of claim 15, further comprising the step of supplying a portion of the fuel exiting the heat exchanger to an engine powering the intermittent heat generating device.

21. The method of claim 15, further comprising circulating fuel from the fuel tank through the reservoir if the temperature of fuel in the fuel tank is less than the temperature of the reservoir.

22. The method of claim 15, further comprising circulating fuel from the reservoir to the fuel tank is the fuel in the fuel tank exceeds a defined temperature.

* * * * *

UNITED STATES PATENT AND TRADEMARK OFFICE
CERTIFICATE OF CORRECTION

PATENT NO. : 10,894,608 B2
APPLICATION NO. : 16/411946
DATED : January 19, 2021
INVENTOR(S) : Donald Klemen et al.

It is certified that error appears in the above-identified patent and that said Letters Patent is hereby corrected as shown below:

In the Claims

In Column 8, Line 36 (fourth line of Claim 15), delete "on the mobile platform".

In Column 9, Line 26 (second line of Claim 22), delete "is" and insert in its place --if--.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*